United States Patent
Ryu et al.

(10) Patent No.: US 9,670,091 B2
(45) Date of Patent: Jun. 6, 2017

(54) HIGH REFRACTIVE INDEX GLASS BEAD WITH HIGH RETROREFLECTIVITY, AND METHOD OF PREPARING THE SAME

(71) Applicant: OCI COMPANY LTD., Seoul (KR)

(72) Inventors: Hae-Yoon Ryu, Seongnam-si (KR); Sang-Je Cho, Anyang-si (KR)

(73) Assignee: OCI COMPANY LTD., Seoul (KR)

( * ) Notice: Subject to any disclaimer, the term of this patent is extended or adjusted under 35 U.S.C. 154(b) by 14 days.

(21) Appl. No.: 14/759,929

(22) PCT Filed: Jan. 9, 2014

(86) PCT No.: PCT/KR2014/000237
§ 371 (c)(1),
(2) Date: Jul. 9, 2015

(87) PCT Pub. No.: WO2014/109564
PCT Pub. Date: Jul. 17, 2014

(65) Prior Publication Data
US 2015/0344355 A1 Dec. 3, 2015

(30) Foreign Application Priority Data

Jan. 9, 2013 (KR) .................. 10-2013-0002554

(51) Int. Cl.
| | |
|---|---|
| *C03C 12/02* | (2006.01) |
| *C03B 19/10* | (2006.01) |
| *G02B 5/126* | (2006.01) |
| *C03C 3/062* | (2006.01) |
| *C03C 3/064* | (2006.01) |
| *C03C 3/12* | (2006.01) |
| *C03C 3/14* | (2006.01) |
| *C03C 3/145* | (2006.01) |
| *C03C 3/155* | (2006.01) |

(52) U.S. Cl.
CPC ............ *C03C 12/02* (2013.01); *C03B 19/102* (2013.01); *C03C 3/062* (2013.01); *C03C 3/064* (2013.01); *C03C 3/127* (2013.01); *C03C 3/14* (2013.01); *C03C 3/145* (2013.01); *C03C 3/155* (2013.01); *G02B 5/126* (2013.01); *Y10T 428/2982* (2015.01)

(58) Field of Classification Search
CPC ......... C03C 12/02; C03B 19/02; G02B 5/126; Y10T 428/2982
USPC ............... 428/402; 501/34; 65/21.1
See application file for complete search history.

(56) References Cited

U.S. PATENT DOCUMENTS

| 7,045,475 | B2 | 5/2006 | Senturk et al. | |
|---|---|---|---|---|
| 7,513,941 | B2 * | 4/2009 | Frey | C03C 3/127 106/31.04 |
| 7,579,293 | B2 * | 8/2009 | Frey | C03C 3/127 501/10 |
| 7,745,360 | B2 * | 6/2010 | Frey | C03C 3/127 106/31.04 |
| 7,947,616 | B2 * | 5/2011 | Frey | C03C 3/127 106/31.04 |

FOREIGN PATENT DOCUMENTS

| JP | 42-22384 Y1 | 12/1967 |
|---|---|---|
| JP | 54-88917 A | 7/1979 |
| JP | 2009-516102 A | 4/2009 |
| JP | 2010-275176 | * 12/2010 |
| JP | 2010275176 A | 12/2010 |
| JP | 2011-178597 | * 9/2011 |
| JP | 2011178597 A | 9/2011 |
| KR | 10-2008-0066063 | * 7/2008 |
| KR | 1020080066063 A | 7/2008 |
| KR | 100973980 B1 | 8/2010 |

OTHER PUBLICATIONS

Lee et al, Optimal Mixtures of Roadway Pavement Marking Beads Under Various Weather Conditions, International Journal of Highway Engineering, Jun. 2012, pp. 131-140, v. 14, n.3.
International Search Report for PCT/KR2014/000237 mailed on Apr. 24, 2014.
Japanese Office Action mailed on Aug. 9, 2016 for Japanese Application No. 2015-552577.

* cited by examiner

*Primary Examiner* — Leszek Kiliman
(74) *Attorney, Agent, or Firm* — Hauptman Ham, LLP

(57) ABSTRACT

The present disclosure provides a retroreflective glass bead that includes at least one high refractive oxide selected from the group consisting of $TiO_2$, BaO, $La_2O$ and $Bi_2O_3$; and at least one additive selected from the group consisting of MgO, CaO, ZnO, $ZrO_2$, $Al_2O_3$, $K_2O$, $Na_2O$, $Li_2O$ and SrO. The glass bead according to the present invention have excellent retroreflectivity according to optical properties and excellent durability and productivity due to a simple structure, and also can be produced in various colors due to high chemical stability. Thus, the retroreflective aggregate including the glass bead according to the present invention exhibits very high visibility under various circumstances such as rainy or dry conditions. In addition, the method of producing a glass bead according to the present invention can reduce manufacturing costs while ensuring excellent productivity.

15 Claims, 4 Drawing Sheets

HIGH REFRACTIVE INDEX GLASS BEAD WITH HIGH RETROREFLECTIVITY, AND METHOD OF PREPARING THE SAME

TECHNICAL FIELD

The present invention relates to a high refractive index glass bead having high retroreflectivity and a method of producing the same. More particularly, the present invention relates to a high refractive index glass bead having high transparency and excellent retroreflectivity under dry or rainy conditions while ensuring improved road visibility, and a method of producing the same.

BACKGROUND ART

Retroreflectivity refers to a physical property of reflecting light back in an incident direction of the light and materials having retroreflectivity are generally used for road signs and roadway markings to enhance visibility while promoting driver safety. Excellent retroreflectivity means that a large amount of incident light is reflected toward an incident direction of the light. Retroreflectivity may be affected by surface area characteristics, a composition of materials, and refractive index and transparency of the materials in combination. Retroreflective materials have generally been developed based on silicon materials having excellent price competiveness and optical properties. The retroreflective materials have various shapes, such as a bead shape, a prism shape, a plane shape, a combined shape, and the like.

Korean Application No. 10-2010-0009432 discloses a composite retroreflective material prepared by bonding a plurality of a small glass bead around a large glass bead using a light reflective adhesive. This technology provides a high reflective index composite, which reflects incident light in multiple directions due to irregular reflection property, and because the multiple directions include an incident direction of light, it demonstrates partial retroreflectivity. However, the retroreflectivity of the composite based on irregular reflection is insufficient in terms of an efficiency of retroreflectivity. This technology has drawbacks that the refractive properties of the composite significantly change depending on various circumstances such as rainy conditions and the like, manufacturing costs are increased also due to the characteristic complexity of the composite structures and that the mass production is inhibited, thereby limiting commercialization of the composite.

U.S. Pat. No. 7,045,475 discloses retroreflective glass beads having refractive index (nd) of 1.59 or more, prepared from a composition including silicone oxide. This technology aims to promote retroreflectivity using glass beads having a uniform spherical shape, and thus the beads are not structurally complicated. However, since refractive index (nd) of 1.59 or more is not sufficient to realize retroreflectivity using the spherical glass beads, it is not possible to provide excellent retroreflectivity. Further, in the case of providing various colors to the glass beads through addition of colorants such that the glass beads can be applied to various fields including road signs, retroreflective sheets and the like, the colorants can cause the negative effects such as devitrification or reduction in refractive index. For example, in the case of retroreflective sheets requiring addition of colorants according to colors of fabric materials and entailing a brightness changing phenomenon due to an interfacial effect between the glass beads and the fabric materials, it is difficult to maintain transparency and refractive index of the glass beads while reducing brightness of the glass beads.

Due to such technical and practical limitations, there has been a continuous need for retroreflective glass beads as retroreflective materials, which have the following properties: 1) a simple spherical structure with high durability, 2) retroreflectivity maintained under various circumstances including the rainy or dry conditions and the like, 3) various optical properties including transparency, refractive index and the like, which are carefully combined to ensure retroreflectivity with increased reflection of incident light back in a direction of an incident angle, and 4) no devitrification, reduction in refractive index, and the like, even in the case of adding colorants. However, until now, glass beads having excellent retroreflectivity and high refractive index satisfying such requirements have not been developed.

DISCLOSURE OF INVENTION

Technical Problem

The present invention has been conceived to solve such problems in the related art, and an aspect of the present invention is to provide glass beads, which not only have excellent retroreflectivity according to optical properties and excellent durability due to a simple structure, but also can be produced in various colors while facilitating mass production.

Another aspect of the present invention is to provide an aggregate that includes the glass beads according to the present invention to exhibit excellent retroreflectivity and visibility under various circumstances, such as rainy or dry conditions and the like. More particularly, the present invention provides a retroreflective aggregate including a plurality of glass beads for panels, road signs, visible paints, and the like.

A further aspect of the present invention is to provide a method of producing glass beads having excellent retroreflectivity and high refractive index, which ensures very high productivity while reducing manufacturing costs.

Solution to Problem

In accordance with one aspect of the present invention, a glass bead includes at least one high refractive oxide selected from the group consisting of $TiO_2$, $BaO$, $La_2O$ and $Bi_2O_3$; and at least one additive selected from the group consisting of $MgO$, $CaO$, $ZnO$, $ZrO_2$, $Al_2O_3$, $K_2O$, $Na_2O$, $Li_2O$ and $SrO$.

In one embodiment, the glass bead may further include at least one glass stabilizer selected from the group consisting of $SiO_2$ and $B_2O_3$.

In another embodiment, the glass bead may include $Li_2O$, $SrO$ and $B_2O_3$.

In a further embodiment, the glass bead may include: 20 wt % to 60 wt % of $TiO_2$; 15 wt % to 55 wt % of $BaO$; 0.1 wt % to 10 wt % of $Li_2O$; 0.1 wt % to 10 wt % of $SrO$; and 1 wt % to 40 wt % of $B_2O_3$.

In yet another embodiment, the glass bead may have refractive index (nd) of 1.7 to 2.0.

In yet another embodiment, the glass bead may include $La_2O$, $Bi_2O_3$, or a mixture thereof.

In yet another embodiment, the glass bead may include 15 wt % to 85 wt % of $TiO_2$, $BaO$, or a mixture thereof; 5 wt % to 75 wt % of $La_2O$, $Bi_2O_3$, or a mixture thereof; and 1 wt % to 15 wt % of $ZrO_2$.

In yet another embodiment, the glass bead may have refractive index (nd) of 2.0 to 2.5.

In yet another embodiment, the glass bead may further include at least one colorant selected from the group consisting of CuO, CeO$_2$, CoO, NiO, and Fe$_2$O$_3$ in an amount of 0.1 parts by weight to 15 parts by weight based on 100 parts by weight of the high refractive oxide(s) and the additive(s).

In yet another embodiment, the glass bead may have a particle diameter of 1 µm to 1000 µm.

In accordance with another aspect of the present invention, a retroreflective aggregate including the glass bead of the present invention is provided.

In one embodiment, the retroreflective aggregate may include a glass bead having refractive index (nd) of 1.7 to 2.0 and a glass bead having refractive index (nd) of 2.0 to 2.5 in a weight ratio of 1:0.1 to 7.

In another embodiment, the retroreflective aggregate may be a panel, a road signs, or a visible paint.

In accordance with a further aspect of the present invention, a method of producing a glass bead includes: a) crushing glassy materials to prepare a glass scrap; and b) injecting the glass scrap using compressed air from a lower inlet of a bead forming furnace, which is divided into a cooling zone and a heating zone from top to bottom of the furnace, toward the cooling zone.

In one embodiment, the glass scrap may have a particle diameter ranging from 1 µm to 1000 µm.

In another embodiment, the heating zone may have a temperature ranging from 1000° C. to 1400° C., and the cooling zone may have a temperature ranging from 10° C. to a temperature of the heating zone.

Advantageous Effects of Invention

The glass bead according to the present invention not only have excellent retroreflectivity according to optical properties and excellent durability due to a simple structure, but can also be produced with various colors due to high chemical stability. Thus, the retroreflective aggregate including the glass bead according to the present invention exhibits very high visibility under various circumstances such as rainy or dry conditions. In addition, the method of preparing a glass bead according to the present invention can reduce manufacturing costs while ensuring significantly excellent productivity.

BEST MODE FOR CARRYING OUT THE INVENTION

Figure 1:
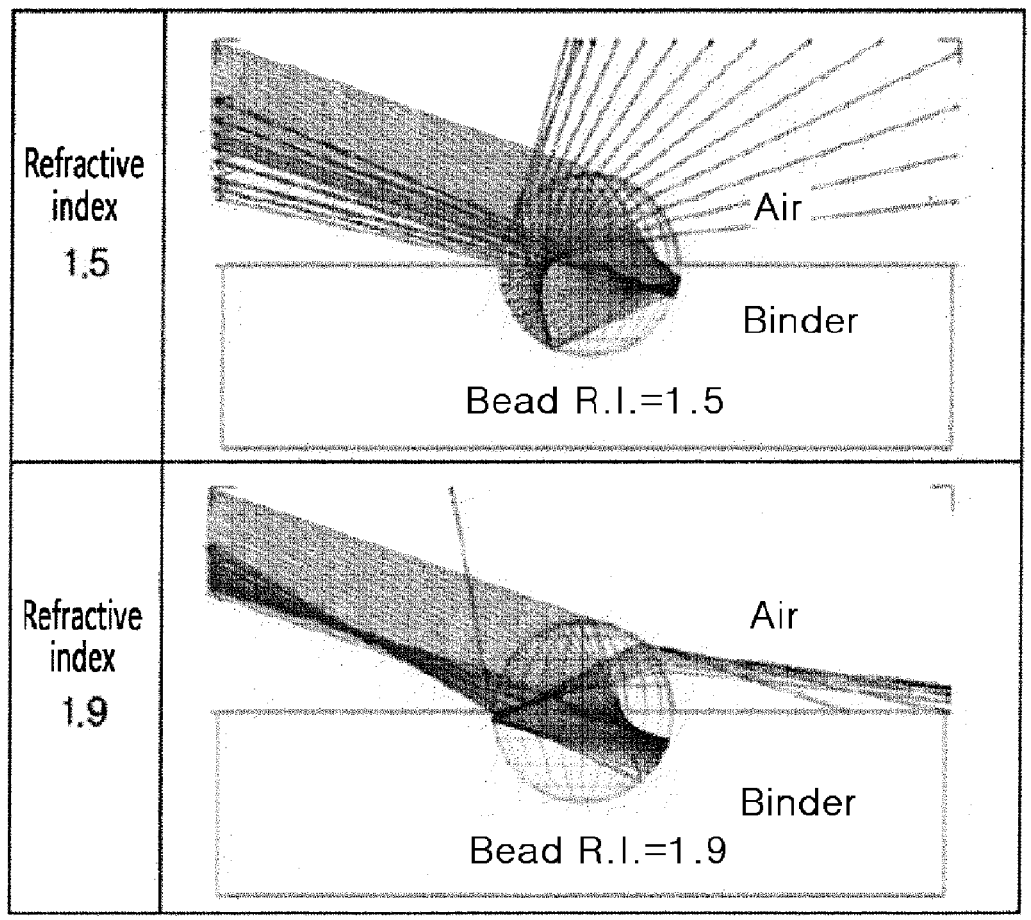
FIG. 1 is an image depicting refractive index of a glass bead representing maximum retroreflectivity under the dry conditions, as calculated using Monte Carlo simulation in the Advanced System Analysis Program (ASAP).

Hereinafter, embodiments of the present invention will be described in detail.

A glass bead according to one embodiment of the present invention includes at least one high refractive oxide selected from the group consisting of TiO$_2$, BaO, La$_2$O and Bi$_2$O$_3$; and at least one additive selected from the group consisting of MgO, CaO, ZnO, ZrO$_2$, Al$_2$O$_3$, K$_2$O, Na$_2$O, Li$_2$O and SrO, and thus have high transparency and a high refractive index. The glass bead may further include at least one glass stabilizer selected from the group consisting of SiO$_2$ and B$_2$O$_3$.

In the case of preparing glass having refractive index of 1.5 or more by adding components containing high refractive oxides, various chemical processes may occur among the components, which may lead to various inhibitory phenomena including devitrification, reduction in refractive index, failure in formation of glassy materials, and the like, during the preparation process due to thermodynamically unstable properties of glass. There are various causes of such phenomena, and estimation of such phenomena and close control of compositions and contents are core issues in preparation of transparent glass having high refractive index. For example, when the content of high refractive oxides such as TiO$_2$, BaO and the like is increased in the glass in order to ensure high refractive index, a possibility of devitrification in the glass composition will exponentially increase.

Typically, in order to prevent devitrification while ensuring high refractive index, various additives such as SiO$_2$, Al$_2$O$_3$, ZrO$_2$ and the like are further added together with the high refractive oxides to promote stabilization of glassy materials. However, despite addition of various additives, devitrification frequently occurs in the case of preparing glass having high refractive index of 1.7 or more. The present invention provides a glass bead further including La$_2$O, Bi$_2$O$_3$, Li$_2$O, SrO or B$_2$O$_3$ in order to overcome such a phenomenon. With such components, a possibility of devitrification can be dramatically reduced in the preparation of high refractive index glass including high refractive oxides such as TiO$_2$, BaO and the like, thereby increase in content of high refractive oxides being allowed. Namely, the glass bead according to the present invention may be realized to be transparent and stable and to have high refractive index.

In a specific embodiment, in case of the glass bead including 20 wt % or more of TiO$_2$ and 15 wt % or more of BaO, the addition of 3 wt % or more of B$_2$O$_3$, 1 wt % or more of Li$_2$O, or 1 wt % or more of SrO provides an effect of reducing devitrification (effect of enhancing transparency). Such effects become further more outstanding when the content of TiO$_2$ is 50 wt % or more, or the content of BaO is 30 wt % or more.

Specifically, the glass bead according to one embodiment of the invention has both high refractive index and high transparency when including Li$_2$O, SrO and B$_2$O$_3$. More specifically, the glass bead according to the present invention includes 20 wt % to 60 wt % of TiO$_2$; 15 wt % to 55 wt % of BaO; 0.1 wt % to 10 wt % of Li$_2$O; 0.1 wt % to 10 wt % of SrO; and 1 wt % to 40 wt % of B$_2$O$_3$. When the glass bead has this composition, the glass bead according to one embodiment of the invention is more stable, which is advantageous in processing and mass production, and have high transparency and the high refractive index (nd) ranging from 1.7 to 2.0.

In addition, when including La$_2$O, B$_2$O$_3$ or a mixture thereof as a high refractive oxide, the glass bead according to one embodiment of the invention may be produced to have the refractive index ranging from 2.0 to 2.5. When only TiO$_2$ (refractive index of 2.1) and BaO (refractive index of 1.88) that is typical high refractive oxides are used, it is difficult for a high refractive glass bead consisting of composite components to have the refractive index of 2.0 or more and transparency, due to the complicated mutual interactions among the components (increase in possibility of devitrification and reduction in refractive index) as mentioned above. Furthermore, the glass bead having an excessively high amount of high refractive oxides in order to ensure a high refractive index may display a dark color, which cannot be applied to various purposes. Accordingly, the present invention employs $La_2O$ (having refractive index of 2.57) or $B_2O_3$ (having refractive index of 3.15) as an ultra high refractive oxide, and thus, the glass bead according to one embodiment of the invention is able to broaden the scope of various additives to be added, and can be realized in a more stable state, have high refractive index and provide a transparent bright color.

Specifically, when $La_2O$, $B_2O_3$ or a mixture thereof is used in an amount of 5 wt % or more, such effects become further more outstanding. More specifically, the glass bead according to one embodiment of the invention includes 15 wt % to 85 wt % of $TiO_2$, BaO, or a mixture thereof; 5 wt % to 75 wt % of $La_2O$, $Bi_2O_3$, or a mixture thereof; and 1 wt % to 15 wt % of $ZrO_2$. With this composition, the glass bead may not only have a more stable form by addition of $ZrO_2$ as an additive, but also realize high refractive index of 2.0 or more, more specifically high refractive index of 2.0 to 2.5, and high transparency. In this case, as mentioned above, $Li_2O$, SrO or $B_2O_3$ may be further used.

As described above, the glass bead according to the present invention is very stable, and has high transparency and high refractive index as well. Accordingly, the optical properties of the glass bead according to the present invention are not damaged, while including additional colorants to display desired color. For example, the glass bead may have at least one colorant selected from the group consisting of CuO, $CeO_2$, CoO, NiO, and $Fe_2O_3$ in an amount of 0.1 parts by weight to 15 parts by weight based on 100 parts by weight of the high refractive oxide(s) and the additive(s). Namely, the glass bead according to the present invention maintains excellent transparency, high refractive index and stability even though the glass bead includes considerable amounts of colorants. In a specific example, when the glass bead includes 50 wt % of $TiO_2$, 34 wt % of BaO, 5 wt % of $SiO_2$, 3 wt % of $B_2O_3$, 5 wt % of $ZrO_2$, 2 wt % of $Li_2O$ and 1 wt % of SrO according to one embodiment of the invention, the glass bead has the following colors and transparency when colorants are included as follows:

Based on 100 parts by weight of the high refractive oxide(s) and the additive(s), when the glass bead includes 0.08 parts by weight of CuO and 0.5 parts by weight of $CeO_2$, the glass bead has a light blue color; when the glass bead includes 1 part by weight of $MnO_2$ and 1.15 parts by weight of $Cr_2O_3$, the glass bead has a brown color; when the glass bead includes 0.2 parts by weight of $MnO_2$ and 0.5 parts by weight of $Cr_2O_3$, the glass bead has a green color; when the glass bead includes 0.2 parts by weight of CoO, the glass bead has a blue color; when the glass bead includes 0.2 parts by weight of $CeO_2$ and 0.3 parts by weight of $Fe_2O_3$, the glass bead has a red color; when the glass bead includes 0.5 parts by weight of $CeO_2$, 0.1 parts by weight of NiO and 0.03 parts by weight of $Fe_2O_3$, the glass bead has a yellow color.

In addition, the glass bead may have a particle diameter ranging from 1 µm to 1000 µm. The particle diameter of the glass bead may be differently designed according to the use thereof. Specifically, when the glass beads are mixed with visible paints to promote visibility of the paints, the glass beads are preferably large (a particle diameter of 1 µm or more) and heavy to increase adhesion to the paints. Since the glass beads according to the invention are produced by a method including upward injection and descending of compressed air, glass scraps having an excessively large size and weight (a particle diameter greater than 1000 µm) may make it difficult to be produced as glass beads.

In order to calculate preferred glass bead conditions exhibiting excellent retroreflectivity under various circumstances including rainy or dry conditions, the inventors of the present invention referenced an article entitled "Optimal Mixtures of Roadway Pavement Marking Beads Under Various Weather Conditions", International Journal of Highway Engineering, v.14, n.3. FIG. 1 illustrates an image depicting a glass bead, light incident upon the glass bead, and light reflected by the glass bead as simulated under the dry conditions of Monte Carlo simulation using the Advanced System Analysis Program (ASAP) as suggested in the above article. As shown, it was observed that a glass bead having typical refractive index of 1.5 diffused a considerable amount of incident light in a direction other than the incident angle. On the contrary, the glass bead having refractive index of 1.9 reflected the incident light intensively toward the incident angle. Various ranges of refractive indices were set and used in the simulation, and it could be seen that a glass bead representing maximum retroreflectivity under the dry conditions has refractive index of 1.9.

Figure 2:
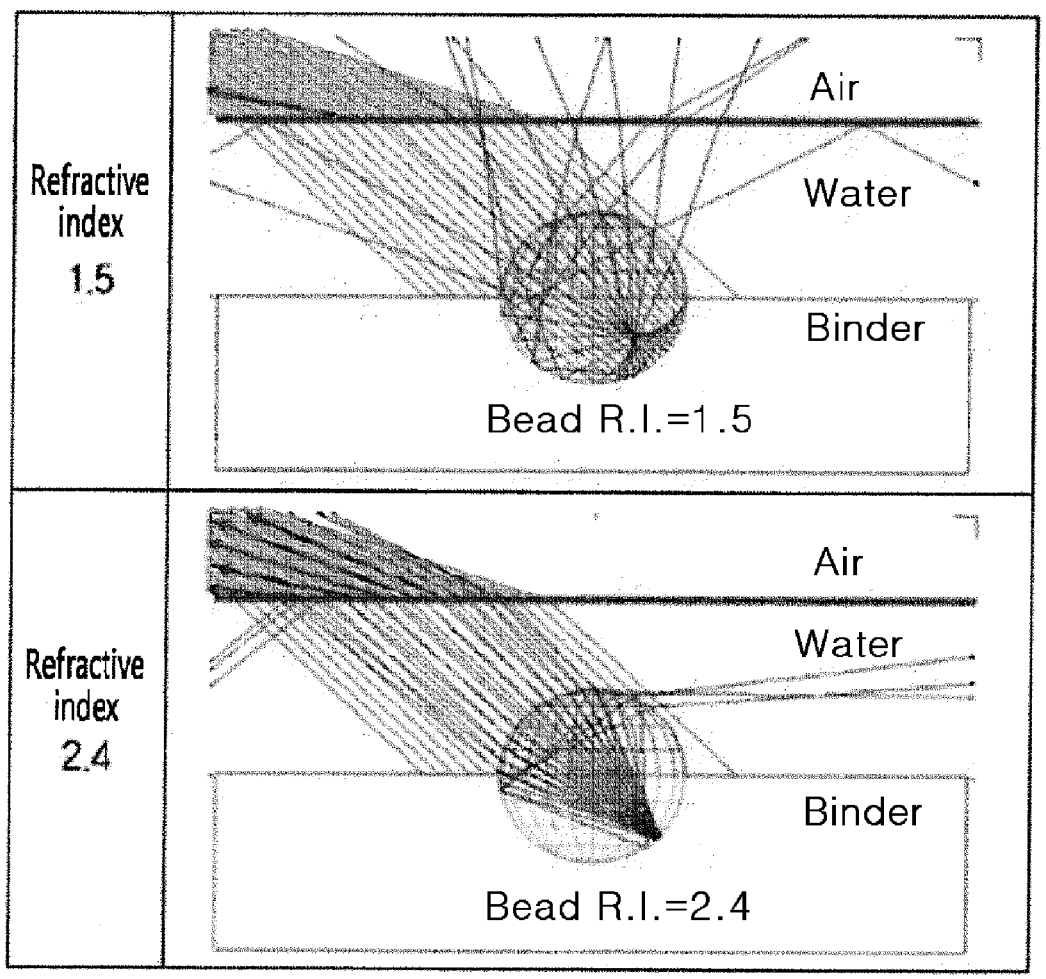
FIG. 2 is an image depicting refractive index of a glass bead representing maximum retroreflectivity under the rainy and water film water film conditions, as calculated using Monte Carlo simulation in the Advanced System Analysis Program (ASAP).

FIG. 2 is an image depicting a water film, a glass bead, light incident upon the glass bead, and light reflected by the glass bead as simulated under rainy weather and water film forming conditions of the above cited article and the program. As shown, it was observed that glass bead having typical refractive index of 1.5 diffused a considerable amount of incident light in a direction other than the incident angle, thereby failing to realize desired retroreflectivity. On the contrary, the glass bead having refractive index of 2.4 reflected the incident light intensively toward the incident angle in the presence of the water layer. Various ranges of refractive indices were set and used in the simulation, and it could be seen that the glass bead representing maximum retroreflectivity under rainy conditions have refractive index of 2.4.

Such simulation results may be numerically represented in $mcd/m^2 \cdot Lux$, which is a quantitative unit demonstrating retroreflectivity. Table 1 shows the results of retroreflectivity according to the refractive index of a glass bead under dry or rainy conditions.

TABLE 1

Reflective property according to refractive index
(Retroreflectivity, $mcd/m^2 \cdot Lux$)

| | Reactive index (nd) of a glass bead | | |
|---|---|---|---|
| Condition of road surface | 1.5 | 1.9 | 2.4 |
| Dried road surface | 313 | 2,495 | 212 |
| Road surface upon raining | 156 | 221 | 1,166 |

(Source: "Optimal Mixtures of Roadway Pavement Marking Beads Under Various Weather Conditions", International Journal of Highway Engineering, v.14, n.3)

As set forth above, the glass bead according to the present invention may be transparent and has refractive index of 1.7 to 2.0, or 2.0 to 2.5, specifically refractive index of 1.8 to 2.0, or 2.3 to 2.5. This means that the refractive index of the glass bead according to the present invention correspond to the preferred refractive index determined by the above measurements and the test results, and exhibits maximum retroreflectivity under dry or rainy conditions. Accordingly, in a retroreflective aggregate including a plurality of a glass bead, such as panels, road signs or visible paints and the like, the aggregate including glass beads having refractive index of 1.7 to 2.0, or 2.0 to 2.5 according to the present invention, specifically refractive index of 1.8 to 2.0, or 2.3 to 2.5, has excellent retroreflectivity under dry or rainy conditions, thereby providing very high visibility.

In one embodiment of the invention, the retroreflective aggregate may include a glass bead having refractive index (nd) of 1.7 to 2.0 and a glass bead having refractive index (nd) of 2.0 to 2.5 in a weight ratio of 1:0.1 to 7 to ensure excellent visibility under any weather conditions regardless of rainy or dry conditions. A weight ratio of 1:0.1 to 7 may be selectively determined in consideration of a possibility of rainy or dry circumstances, and cost difference in preparation of each type of glass beads. It should be understood that the present invention is not limited to a certain ratio of a glass bead, and that the above amount ratio is provided for illustration only.

Hereinafter, a method of producing a glass bead according to one embodiment of the present invention will be described.

The glass bead according to the present invention has a uniform composition and a simple spherical form, and thus is advantageous in mass production. Accordingly, the glass bead according to the present invention may be prepared by a method including: a) crushing glassy materials to prepare a glass scrap; and b) injecting the glass scraps using compressed air from a lower inlet of a bead forming furnace, divided into a cooling zone and a heating zone from top to bottom, toward the cooling zone. Such a method is advantageous in mass production and is capable of producing more than 100 glass beads at the same time.

Figure 4:
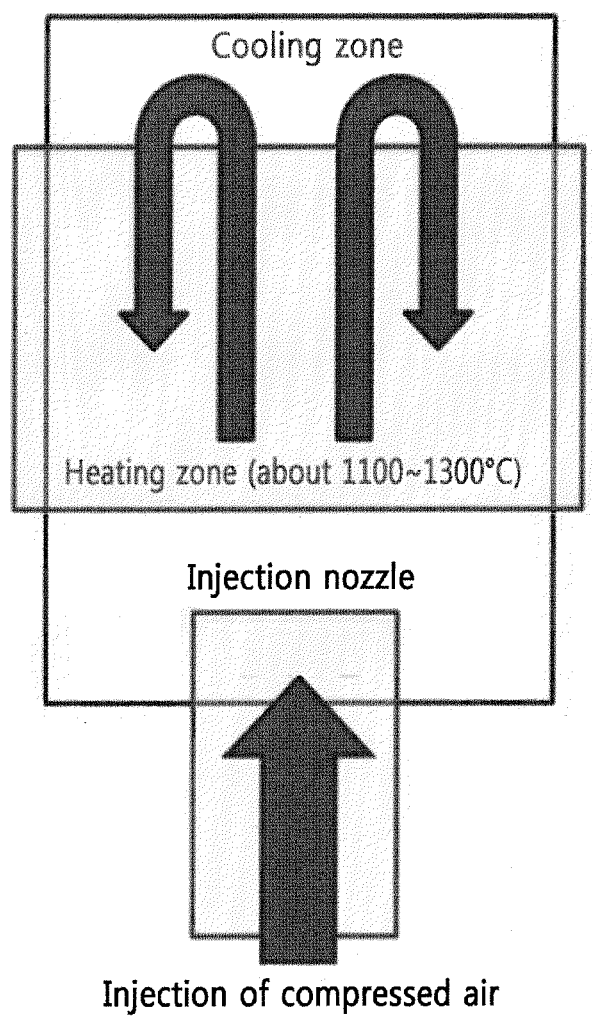
FIG. 4 is a schematic view of a method of producing a glass bead according to one embodiment of the present invention.

FIG. 4 illustrates a schematic view of a method of producing a glass bead. As shown, the glass scraps are injected by compressed air from a lower inlet of a bead forming furnace toward an upper portion of the bead forming furnace, namely, toward the cooling zone, and the glass scraps are to be changed into a softened state having a determined viscosity at a temperature higher than or equal to a glass softening point thereof while passing through the heating zone. The softened glass scraps are to be changed into spherical beads due to thermal behavior thereof, to be solidified while passing through the upper cooling zone, and to descend due to gravity, thereby to be formed as glass beads. The detailed descriptions for the glass materials and the compositions of the glass scraps are skipped for the same can be applied as the glass bead according to the present invention. Considering the fact that the glass bead is made from the glass scraps, the glass scrap may have a particle diameter of 1 μm to 1000 μm as set forth in the description regarding a suitable size of the glass beads. Specifically, when the particle diameter of the glass scrap is greater than 1000 μm, it is difficult to achieve continuous operation of the method including upward injection of the glass scraps using compressed air.

So long as the aforementioned mechanism can be achieved, the present invention is not limited by the shape from the bead forming furnace. Namely, the bead forming furnace has a shape selected from the group consisting of spherical, rectangular, cylindrical shapes, and the like. The bead forming furnace may also have other shapes.

Furthermore, so long as the aforementioned mechanism can be achieved, the present invention is not limited by the temperatures of the heating zone and the cooling zone in the bead forming furnace. However, considering that the method according to the present invention is closely correlated with a melting point of a glass composition and a forming temperature, the heating zone may have a temperature ranging from 1000° C. to 1400° C. and the cooling zone may have a temperature ranging from 10° C. to a temperature of the heating zone in order to prepare glass beads having the composition according to the present invention.

Hereinafter, the present invention will be described in more detail with reference to the following preferred examples. It will be obvious to skilled persons having ordinary knowledge in the art that these examples are provided for illustration only and are not to be in any way construed as limiting the present invention.

Example and Experimental Example 1: Preparation of Glass Beads Having the Refractive Indices of 1.7 to 2.0

Glass beads having various compositions according to the present invention were prepared by the preparation method as set forth above, followed by measuring the refractive index. Table 2 shows amount ratios for the components of the glass beads having a refractive index (nd) of 1.7 to 2.0, and occurrence of devitrification.

TABLE 2

| | Amount ratios for components of glass bead (wt %) | | | | | | | | | | | | Properties | |
|---|---|---|---|---|---|---|---|---|---|---|---|---|---|---|
| | High refractive oxide | | Glass stabilizer | | Additives | | | | | | | | Refractive | Devitri- |
| | $TiO_2$ | BaO | $SiO_2$ | $B_2O_3$ | MgO | CaO | ZnO | $ZrO_2$ | $Al_2O_3$ | $K_2O$ | $Na_2O$ | $Li_2O$ | SrO | index | fication |
| Ex. 1 | 25 | 30 | 15 | | | 8 | 7 | 5 | | 10 | | | | 1.70 | X |
| Ex. 2 | 35 | 40 | 10 | | | 5 | 5 | | 5 | | | | | 1.86 | X |
| Ex. 3 | 40 | 40 | 10 | | | 5 | | | 5 | | | | | 1.89 | X |
| Ex. 4 | 50 | 30 | 15 | | | 2 | | | 2 | 1 | | | | 1.89 | ○ |
| Ex. 5 | 50 | 30 | 5 | 10 | | 2 | | | 2 | 1 | | | | 1.90 | X |
| Ex. 6 | 40 | 30 | 10 | | 5 | | 5 | 5 | | 5 | | | | 1.93 | ○ |
| Ex. 7 | 45 | 35 | 7 | | | 3 | 3 | 5 | | 1 | 1 | | | 1.94 | ○ |
| Ex. 8 | 50 | 30 | 10 | | 2 | 2 | | 5 | | | 1 | | | 1.95 | X |
| Ex. 9 | 50 | 34 | 5 | 3 | | | | 5 | | | | 2 | 1 | 1.96 | X |
| Ex. 10 | 50 | 40 | | 3 | | | | 3 | | | | 3 | 1 | 2.01 | X |

As shown in the table, the occurrence of devitrification and the refractive indices of the glass beads vary depending on the composition of the glass beads. When preparing glass beads having refractive index of 1.89 or more, it is possible to produce highly refractive glass beads that do not demonstrate devitrification by thoroughly adjusting the component ratio, or by adding $B_2O_2$, $Li_2O$ or SrO in suitable ratios.

Example and Experimental Example 2: Preparation of Glass Beads Having the Refractive Indices of 2.0 to 2.5

Glass beads having various compositions according to the present invention were prepared by the preparation method as set forth above, followed by measuring refractive index. Table 3 shows amount ratios for the components of the glass beads having refractive indices (nd) of 2.0 to 2.5, and occurrence of devitrification

TABLE 3

| | Amount ratio for components of glass beads (wt %) | | | | | | | | | | | | | Properties | |
|---|---|---|---|---|---|---|---|---|---|---|---|---|---|---|---|
| | High refractive Oxide | | | | Glass stabilizer | | Additives | | | | | | | Refractive | Devitri- |
| | $TiO_2$ | BaO | $La_2O$ | $Bi_2O_3$ | $SiO_2$ | $B_2O_3$ | CaO | $ZrO_2$ | $Al_2O_3$ | $K_2O$ | $Na_2O$ | $Li_2O$ | SrO | index | fication |
| Ex. 11 | 55 | 30 | | | 3 | | 2 | 7 | | 1 | 2 | | | 2.00 | ○ |
| Ex. 12 | 55 | 30 | | | | 3 | | 8 | | | | 3 | 1 | 2.00 | X |
| Ex. 13 | 60 | 35 | | | | | 2 | 2 | 1 | | | | | 2.03 | ○ |
| Ex. 14 | 55 | 40 | | | | | | 3 | | | | 1 | 1 | 2.03 | ○ |
| Ex. 15 | 45 | 30 | | 13 | 5 | | 2 | 3 | | 1 | 1 | | | 2.00 | X |
| Ex. 16 | 50 | 30 | 9 | | | 3 | | 3 | 2 | | | 1 | 2 | 2.01 | X |
| Ex. 17 | 35 | 25 | | 20 | 5 | | 3 | 10 | | | | 2 | | 2.01 | X |
| Ex. 18 | 50 | | 40 | | | | | 7 | | | | 2 | 1 | 2.14 | X |
| Ex. 19 | 36 | | 40 | 12 | | | | 10 | | | | | 2 | 2.45 | X |
| Ex. 20 | 10 | 6 | 30 | 40 | | | | 9 | 3 | | | | 2 | 2.51 | X |

As shown in the table, the occurrence of devitrification and the refractive index of the glass beads vary depending on the composition of the glass beads. When preparing glass beads having an ultra-high refractive index of 2.0 or more, it is possible to prepare ultra-highly refractive glass beads that do not demonstrate devitrification by thoroughly adjusting the component ratio or by adding $Li_2O$ or $Bi_2O_3$ in a suitable ratio.

Experimental Example 3: Measurement of Optical Transmittance

Figure 3:
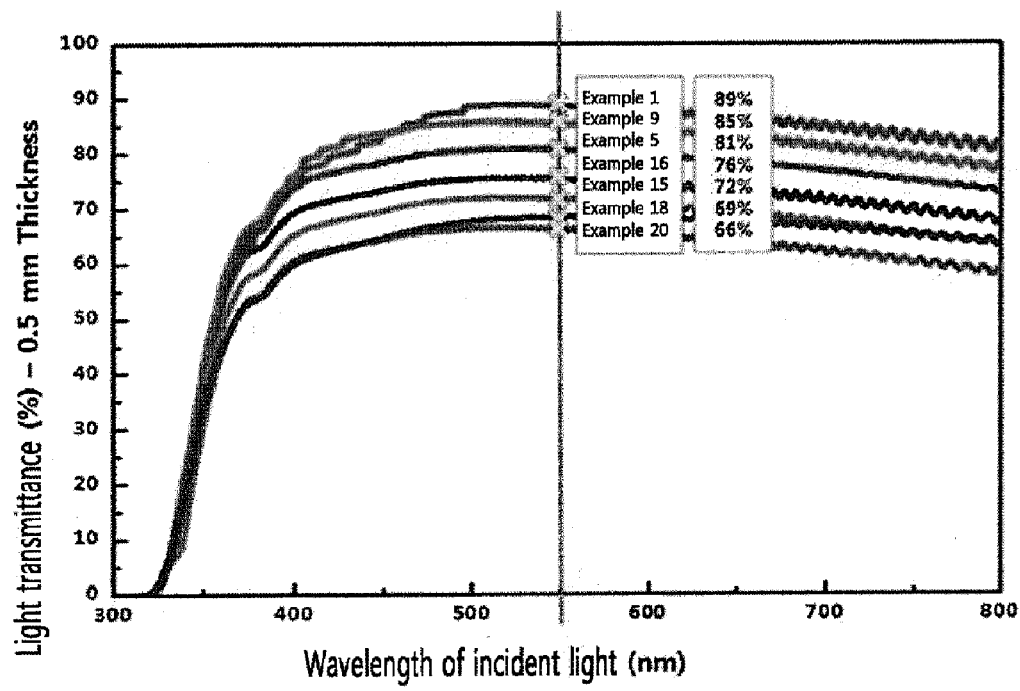
FIG. 3 is a graph depicting transparency of glass beads prepared in examples of the present invention.

Considering that light passes through the glass beads and is then reflected, it is desirable that the glass beads maintain transparency in addition to the refractive index condition in order to ensure retroreflectivity. Among the above examples, glass composition samples providing no devitrification and having excellent optical properties were selected and are subjected to light transmittance testing, and results are shown in FIG. 3. The samples had a thickness of 0.5 mm, and an irradiation wavelength was set in a visible light range of 550 nm. As shown, all of the samples had a high light transmittance of 65% or more. This, together with a high refractive index property, is one of a essential properties of the glass beads according to the present invention in order to provide excellent retroreflectivity.

The invention claimed is:

1. A glass bead comprising:
at least one high refractive oxide selected from the group consisting of $TiO_2$, and BaO; and
at least one additive selected from the group consisting of MgO, CaO, ZnO, $ZrO_2$, $Al_2O_3$, $K_2O$, $Na_2O$, $Li_2O$ and SrO,
wherein the glass bead has a light transmittance of 65% or more, and a refractive index of 1.7 to 2.0.

2. The glass bead according to claim 1, further comprising at least one glass stabilizer selected from the group consisting of $SiO_2$ and $B_2O_3$.

3. The glass bead according to claim 2, wherein the glass bead comprises $Li_2O$, SrO and $B_2O_3$.

4. The glass bead according to claim 3, comprising: 20 wt % to 60 wt % of $TiO_2$; 15 wt % to 55 wt % of BaO; 0.1 wt % to 10 wt % of $Li_2O$; 0.1 wt % to 10 wt % of SrO; and 1 wt % to 40 wt % of $B_2O_3$.

5. A glass bead comprising:
$TiO_2$, BaO, or a mixture thereof;
$La_2O$, $Bi_2O_3$, or a mixture there of; and
at least one additive selected from the group consisting of MgO, CaO, ZnO, $ZrO_2$, $Al_2O_3$, $K_2O$, $Na_2O$, $Li_2O$ and SrO,
wherein the glass bead has a light transmittance of 65% or more, and a refractive index of 2.0 to 2.5.

6. The glass bead according to claim 5, comprising:
15 wt % to 85 wt % of $TiO_2$, BaO, or a mixture thereof;
5 wt % to 75 wt % of $La_2O$, $Bi_2O_3$, or a mixture thereof; and
1 wt % to 15 wt % of $ZrO_2$.

7. The glass bead according to claim 1, wherein the glass bead comprises at least one colorant selected from the group consisting of CuO, $CeO_2$, CoO, NiO, and $Fe_2O_3$ in an amount of 0.1 parts by weight to 15 parts by weight based on 100 parts by weight of the high refractive oxide(s) and the additive(s).

8. The glass bead according to claim 1, wherein the glass bead has a particle diameter of 1 μm to 1000 μm.

9. A retroreflective aggregate comprising the glass bead according to claim 1.

10. The retroreflective aggregate according to claim 9, wherein the retroreflective aggregate comprises a glass bead having refractive index (nd) of 1.7 to 2.0, and a glass bead having refractive index (nd) of 2.0 to 2.5 in a weight ratio of 1:0.1 to 7.

11. The retroreflective aggregate according to claim 9, wherein the retroreflective aggregate is a panel, a road sign or a visible paint.

12. A method of producing a glass bead, the method comprising:
crushing glassy materials to prepare a glass scrap; and injecting the glass scrap using compressed air from a lower inlet of a bead forming furnace, which is divided into a cooling zone and a heating zone from top to bottom, toward the cooling zone, and softening the glass scrap while passing through the heating zone, and solidifying the softened glass scrap while passing through the upper cooling zone.

13. The method according to claim 12, wherein the glass scrap has a particle diameter of 1 μm to 1000 μm.

14. The method according to claim 12, wherein the heating zone has a temperature ranging from 1000° C. to 1400° C., and the cooling zone has a temperature ranging from 10° C. to a temperature of the heating zone.

15. The glass bead according to claim 5, wherein the glass bead consists of:

$TiO_2$, BaO, or a mixture thereof;

$La_2O$, $Bi_2O_3$, or a mixture there of; and at least one additive selected from the group consisting of MgO, CaO, ZnO, $ZrO_2$, $Al_2O_3$, $K_2O$, $Na_2O$, $Li_2O$ and SrO.

* * * * *